United States Patent
Sohum et al.

(10) Patent No.: US 12,354,134 B2
(45) Date of Patent: Jul. 8, 2025

(54) METHOD AND SYSTEM TO ENCODE USER VISIBILITY COUNT

(71) Applicant: Affle MEA FZ-LLC, Dubai (AE)

(72) Inventors: Anuj Khanna Sohum, Singapore (SG); Charles Yong Jien Foong, Singapore (SG); Madhusudana Ramakrishna, Singapore (SG); Guillermo Fernandez Sanz, Guadalajara (ES); Adrian Gigante Beneito, Alcoi (ES); Barbara Diaz Duran, Madrid (ES); Christian Karem Taidi Santana, Marbella (ES); Karanbir Singh Sehgal, Dubai (AE)

(73) Assignee: Affle MEA FZ-LLC, Dubai (AE)

( * ) Notice: Subject to any disclaimer, the term of this patent is extended or adjusted under 35 U.S.C. 154(b) by 160 days.

(21) Appl. No.: 17/820,852

(22) Filed: Aug. 18, 2022

(65) Prior Publication Data
US 2024/0062241 A1 Feb. 22, 2024

(51) Int. Cl.
*G06Q 30/02* (2023.01)
*G06Q 30/0242* (2023.01)
*G06Q 30/0251* (2023.01)
*G06Q 30/0241* (2023.01)
*H04N 21/81* (2011.01)

(52) U.S. Cl.
CPC ..... *G06Q 30/0254* (2013.01); *G06Q 30/0246* (2013.01); *G06Q 30/0277* (2013.01); *H04N 21/812* (2013.01)

(58) Field of Classification Search
CPC .......... G06Q 30/0254; G06Q 30/0246; G06Q 30/0277; H04N 21/812
See application file for complete search history.

(56) References Cited

U.S. PATENT DOCUMENTS

| | | | |
|---|---|---|---|
| 2013/0262165 A1* | 10/2013 | Gao | G06Q 30/0631 705/7.11 |
| 2015/0067819 A1* | 3/2015 | Shribman | H04L 43/0864 709/218 |
| 2016/0171008 A1* | 6/2016 | Ciabrini | G06F 16/24552 707/609 |
| 2019/0288926 A1* | 9/2019 | Hebeler, Jr. | H04M 15/58 |
| 2020/0226418 A1* | 7/2020 | Dorai-Raj | G06F 16/313 |

* cited by examiner

*Primary Examiner* — Chenea Davis
(74) *Attorney, Agent, or Firm* — Kolisch Hartwell, P.C.

(57) ABSTRACT

The present disclosure provides a computer system (112). The computer system (112) performs a method for encoding user count with a low memory footprint. The method includes a first step of receiving real-time and adaptive frequency of user visibility. Further, the method includes another step of receiving a user device (106) id associated with one or more users (104). Furthermore, the method includes yet another step of encoding the user visibility count. The frequency of the user visibility is the number of times the computer system receives a request from a user device (106). The user device (106) id is a unique string of numbers and letters. The unique string of numbers and letters identifies the user device (106) associated with one or more user (104). The user visibility count is encoded by using one or more data structures and one or more algorithms.

12 Claims, 8 Drawing Sheets

METHOD AND SYSTEM TO ENCODE USER VISIBILITY COUNT

TECHNICAL FIELD

The present invention relates to the technical field of data encoding and, in particular, relates to user data encoding with a memory-saving approach.

INTRODUCTION

Over the past few years, online advertising has made good use of identity-based information. The identity-based information may include any of user audiences, user segments or user segment counts. In general, data encoding is the process of converting any sort of data or sequence into a specified format for data transmission. The storage of user data in any format takes up a lot of memory units. This data is used for advertising purposes. Real-time bidding advertising networks, also known as programmatic advertising or RTB, are one of the most common ways of interacting with advertising inventory. Buyers bid for impressions for their creatives in real-time using information included in the impression bid. Connected TV video ads (CTV) are a subset of programmatic advertising. CTVs are characterized for device types being Smart TVs, setup boxes and other connected devices. Further, viewership is the most common parameter to measure the attention of any user. However, awareness, user attention or user engagement may not be determined in connected TVs. A bid impression with higher user awareness is likely to produce better results of user interaction. However, the connected TV video ads (CTV) lack feedback information in the form of clicking or others. The invention uses user frequency count as a representation of user awareness. The low memory footprint of the invention allows storing many counters and even multiple counters per user with reduced memory requirements.

SUMMARY

In a first example, a computer-implemented method is provided. The computer-implemented method encodes user count with a low memory footprint for advertising. The computer-implemented method includes a first step of receiving real-time and adaptive frequency of the user visibility. The computer-implemented method includes another step of receiving a user device id associated with the user. The computer-implemented method includes yet another step of encoding the user visibility count. The frequency of the user visibility is the number of times the computer system receives a request from a user device. The user device id is a unique string of numbers and letters. The unique string of numbers and letters identifies the user device associated with the user. The user visibility count is encoded by using one or more data structures and one or more algorithms.

In an embodiment of the present disclosure, the user device id includes at least one of IMEI, TAC, Mac address, advertising ID, IDFA, AAID, cookie ID or UDID.

In an embodiment of the present disclosure, the the user visibility count is encoded by using one or more hardware run algorithms. One or more hardware run algorithms include a hashing function. The hashing function includes at least one of murmur hash, buzhash, FNV hash, p hash, d hash and other cryptographic or non-cryptographic hash functions.

In an embodiment of the present disclosure, the user visibility count is encoded using a probabilistic approach. The probabilistic approach can increase the user visibility count, decrease the user visibility count and reset the user visibility count to zero.

In an embodiment of the present disclosure, the user visibility count is encoded using a probabilistic approach to encode the user visibility count to reduce the storage required to encode the user visibility count.

In an embodiment of the present disclosure, the computer-implemented method performs a pseudo aleatory computation. The computer-implemented method includes generation of a random number by performing the pseudo aleatory computation.

In an embodiment of the present disclosure, the computer-implemented method includes comparison of the generated number with the probability relation of the current user visibility count for increasing the user visibility count. A positive comparison increases the user visibility count.

In an embodiment of the present disclosure, the computer-implemented method includes comparison of the generated number with the probability relation of the current user visibility count for decreasing the user visibility count. A negative comparison decreases the user visibility count.

In an embodiment of the present disclosure, the computer-implemented method includes resetting the user visibility count to zero. The user visibility count is reset to zero when the frequency of the user visibility is zero for a fixed period of time.

In an embodiment of the present disclosure, the probability relation is the relation between the current user visibility count. The probability relation changes with a change in the state of user visibility count.

In a second example, a computer system is provided. The computer system includes one or more processors and a memory. The memory is coupled to the one or more processors. The memory stores instructions. The instructions are executed by the one or more processors. The execution of instructions causes the one or more processors to perform a method for encoding user count with a low memory footprint for advertising. The method includes a first step of receiving real-time and adaptive frequency of the user visibility. The method includes another step of receiving a user device id associated with the user. The method includes yet another step of encoding the user visibility count. The frequency of the user visibility is the number of times the computer system receives a request from a user device. The user device id is a unique string of numbers and letters. The unique string of numbers and letters identifies the user device associated with the user. The user visibility count is encoded by using one or more data structures and one or more algorithms.

In an embodiment of the present disclosure, the user device id includes at least one of IMEI, TAC, Mac address, advertising ID, IDFA, AAID, cookie ID or UDID.

In an embodiment of the present disclosure, the computer system encodes the user visibility count by using one or more algorithms. One or more hardware run algorithms include a hashing function. The hashing function includes at least one of murmur hash, buzhash, FNV hash, p hash, d hash and other cryptographic or non-cryptographic hash functions.

In an embodiment of the present disclosure, the computer system uses a probabilistic approach to encode the user visibility count. The probabilistic approach can increase the user visibility count, decrease the user visibility count and reset the user visibility count to zero.

In an embodiment of the present disclosure, the computer system uses a probabilistic approach to encode the user visibility count to reduce the storage required to encode the user visibility count.

In an embodiment of the present disclosure, the computer system performs a pseudo aleatory computation. The computer system generates a random number by performing the pseudo aleatory computation.

In an embodiment of the present disclosure, the computer system compares the generated number with the probability relation of the current user visibility count for increasing the user visibility count. A positive comparison increases the user visibility count.

In an embodiment of the present disclosure, the computer system compares the generated number with the probability relation of the current user visibility count for decreasing the user visibility count. A negative comparison decreases the user visibility count.

In an embodiment of the present disclosure, the computer system resets the user visibility count to zero. The computer system resets the user visibility count to zero when the frequency of the user visibility is zero for a fixed period of time.

In an embodiment of the present disclosure, the probability relation is the relation between the current user visibility count. The probability relation changes with a change in the state of user visibility count.

BRIEF DESCRIPTION OF THE FIGURES

Figure 1:
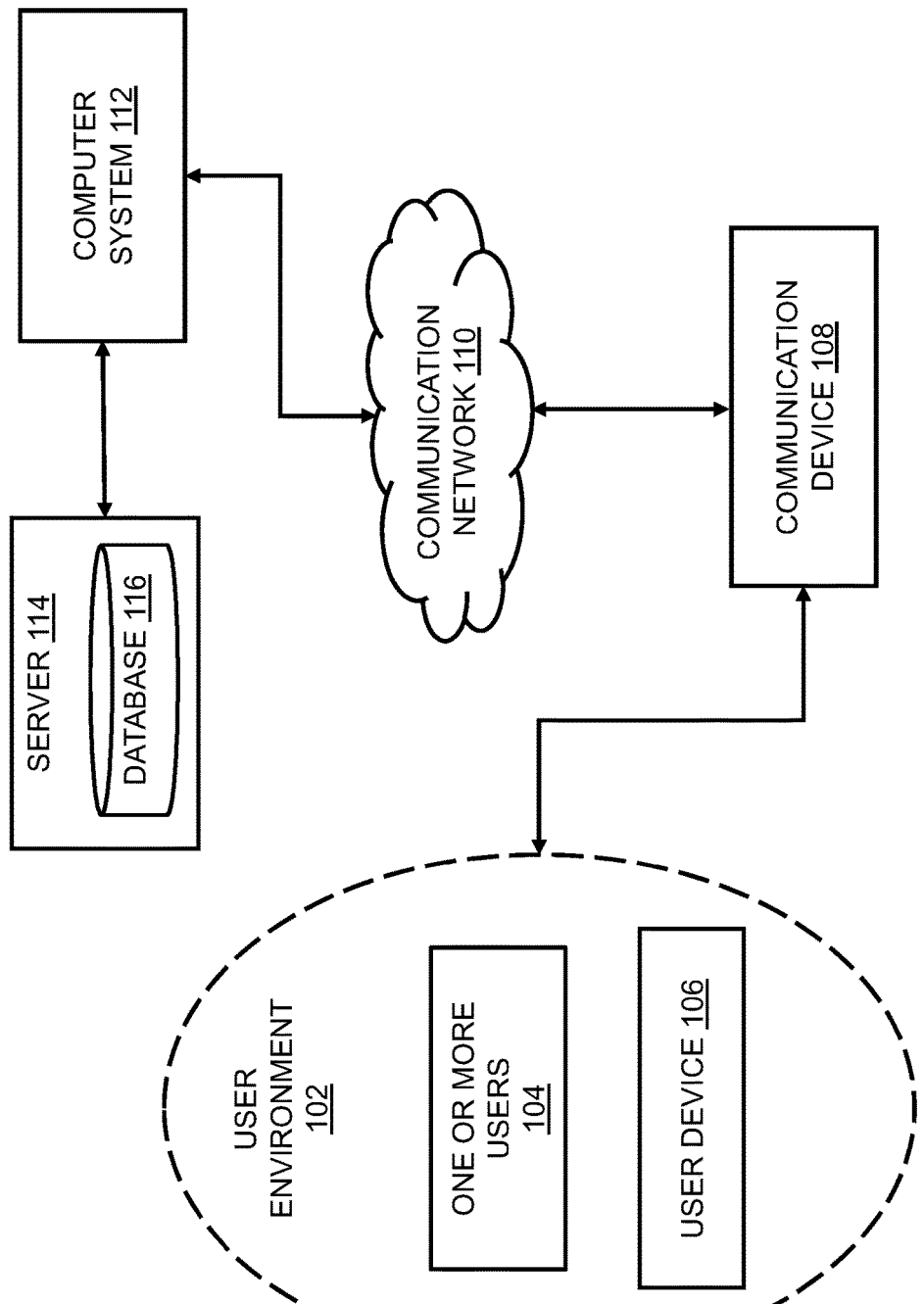
Figure 2:
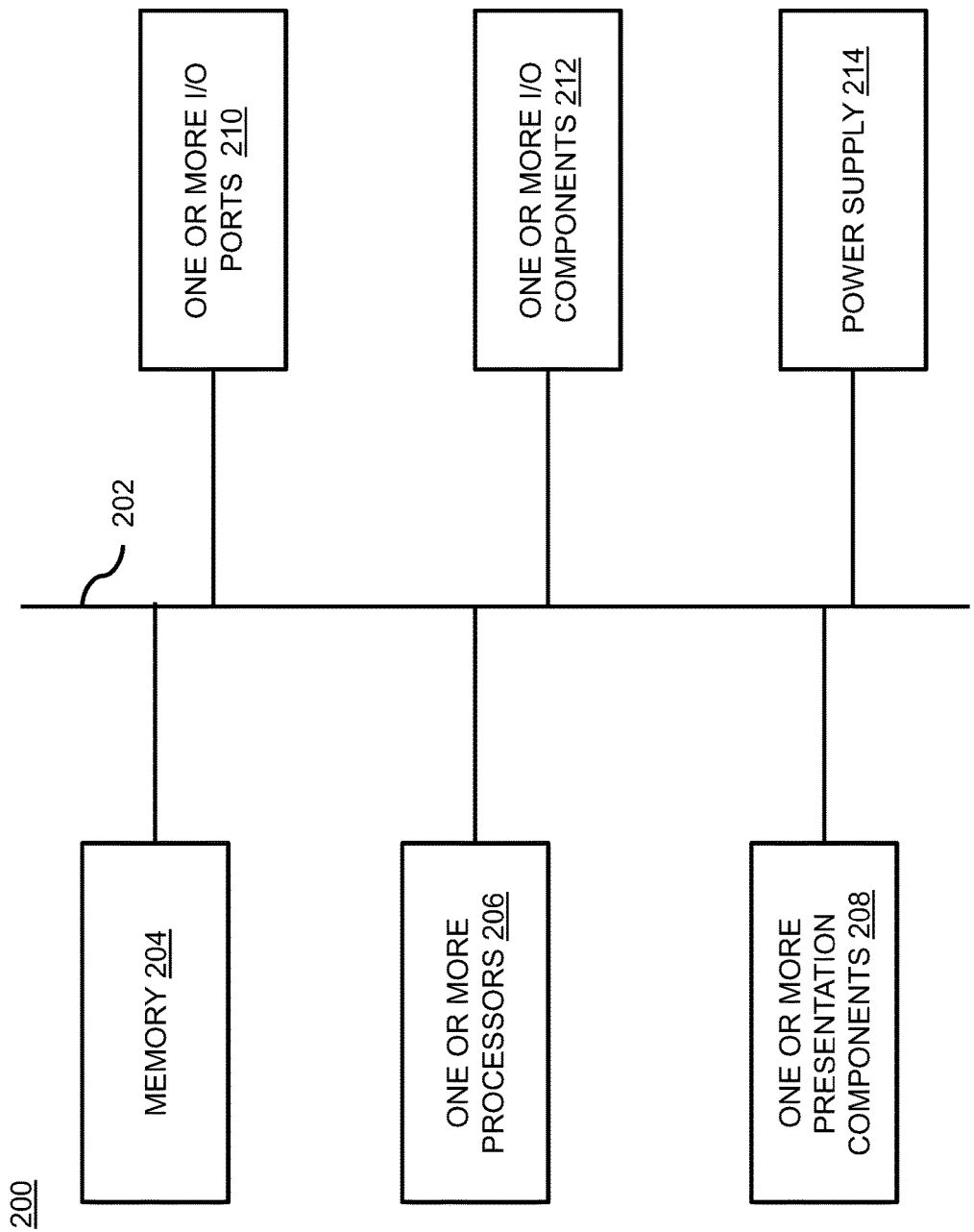
Figure 3:
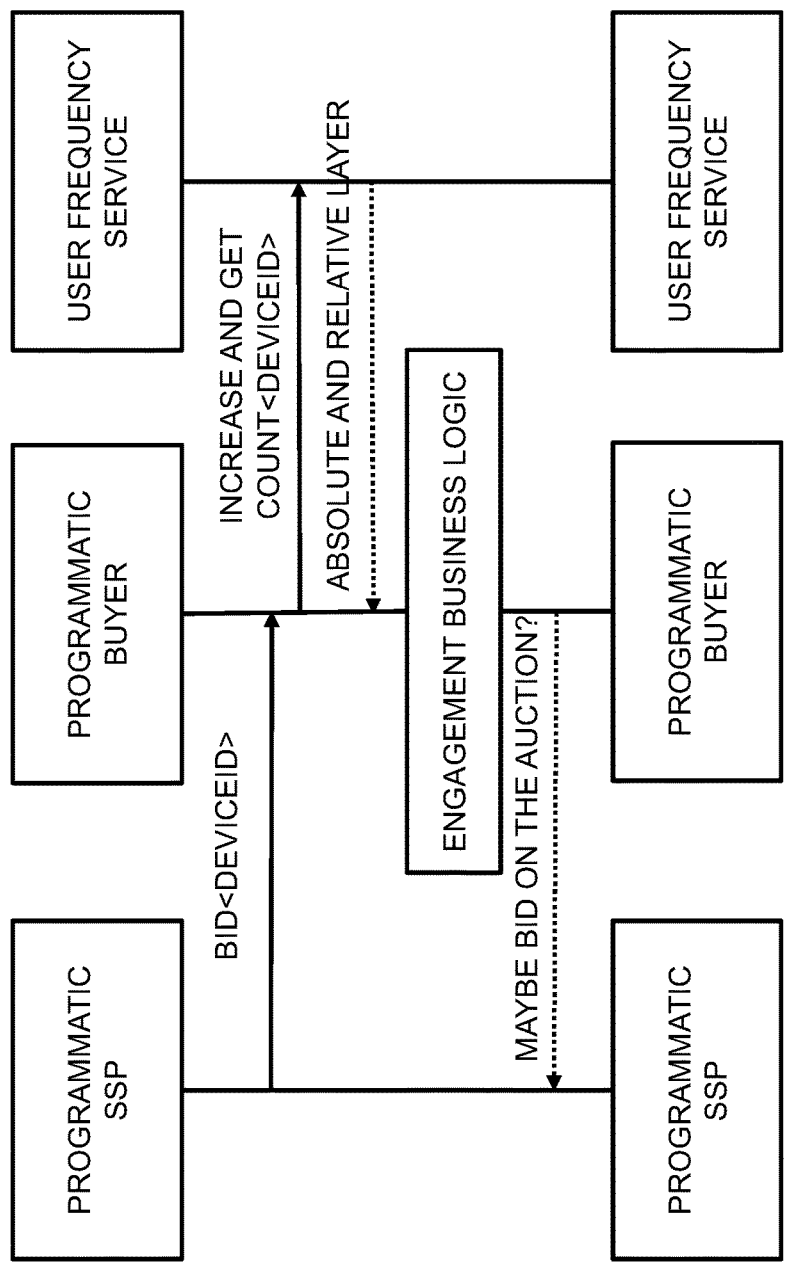
Figure 4:
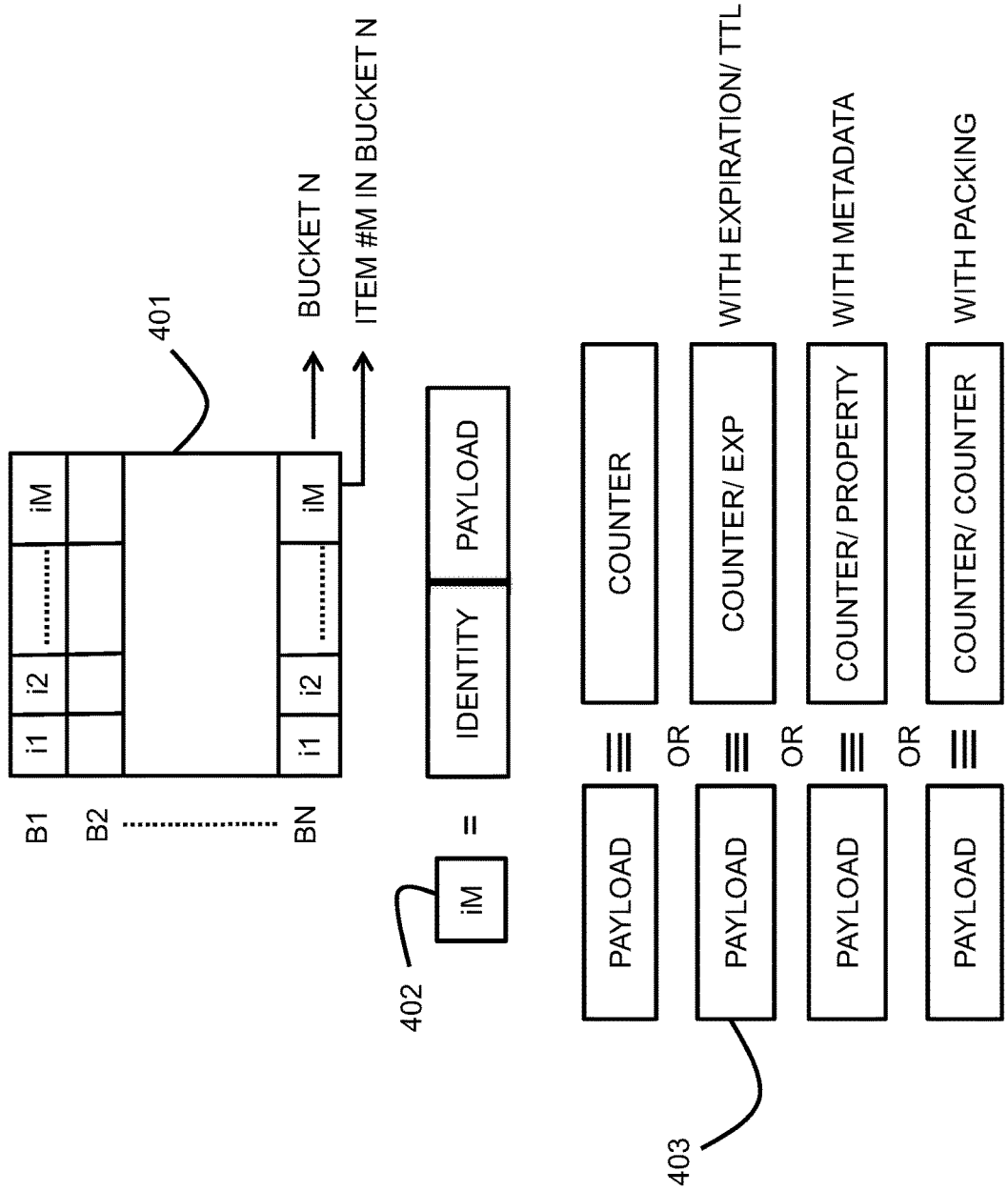
Figure 5:
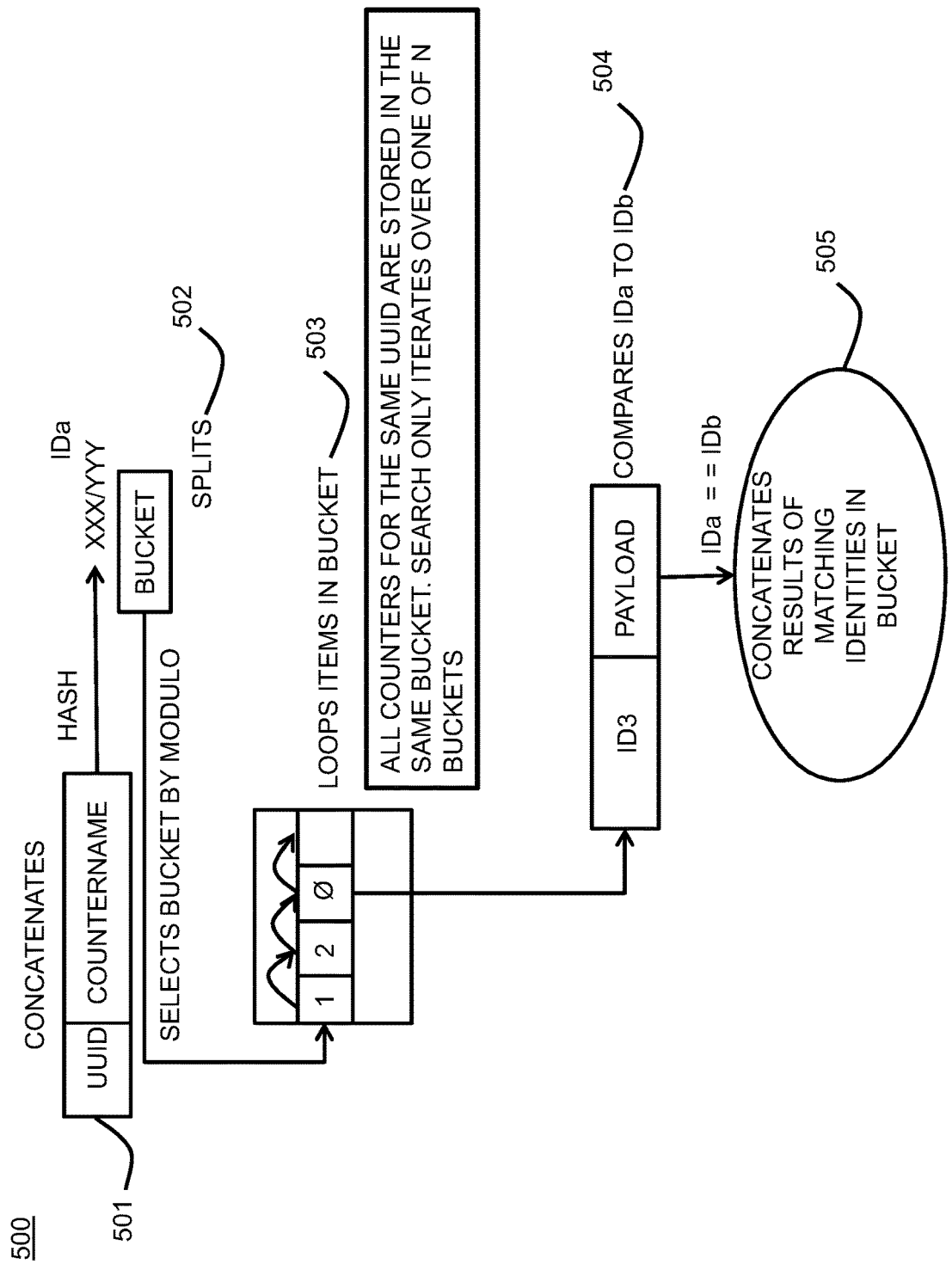
Figure 6:
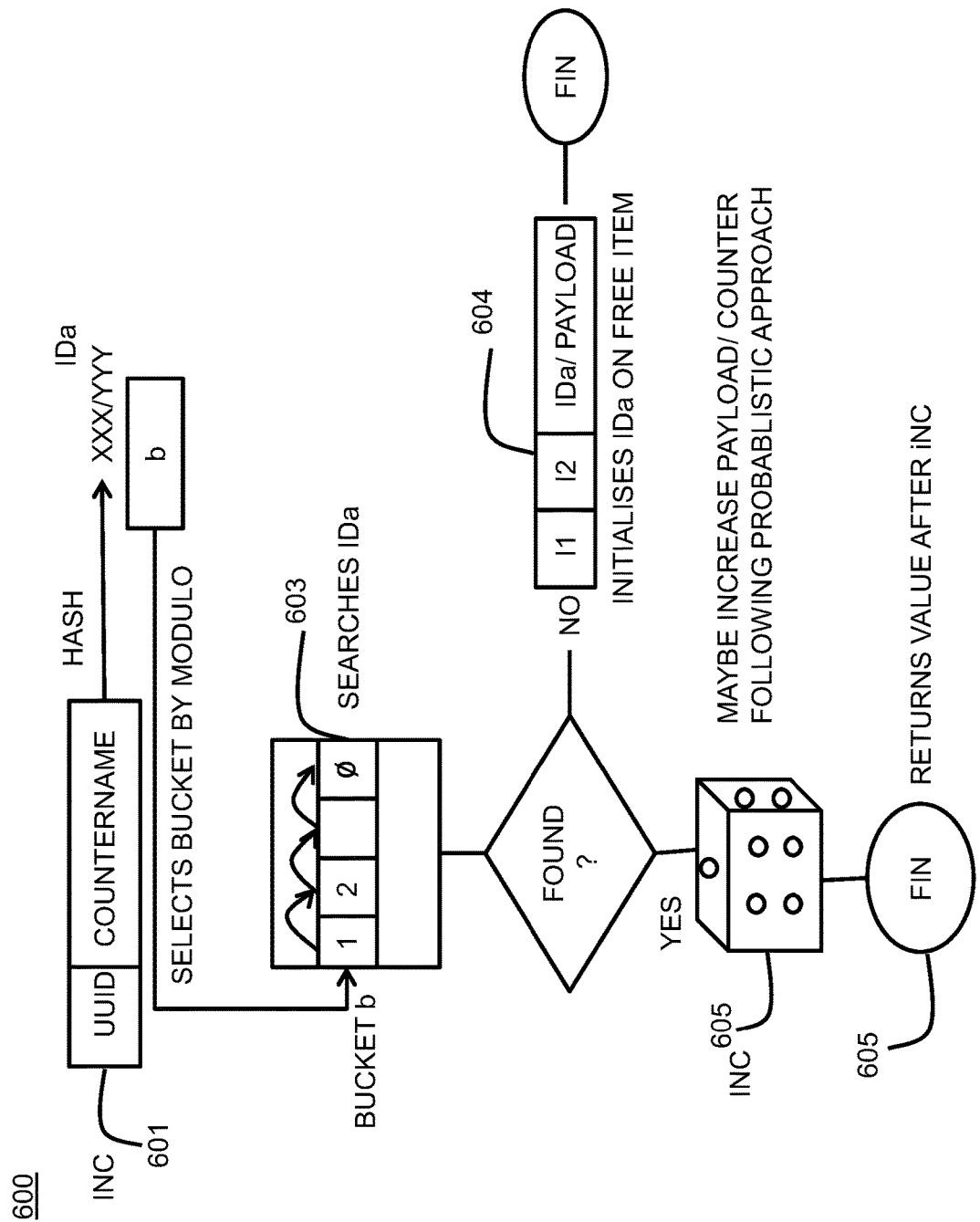
Figure 7:
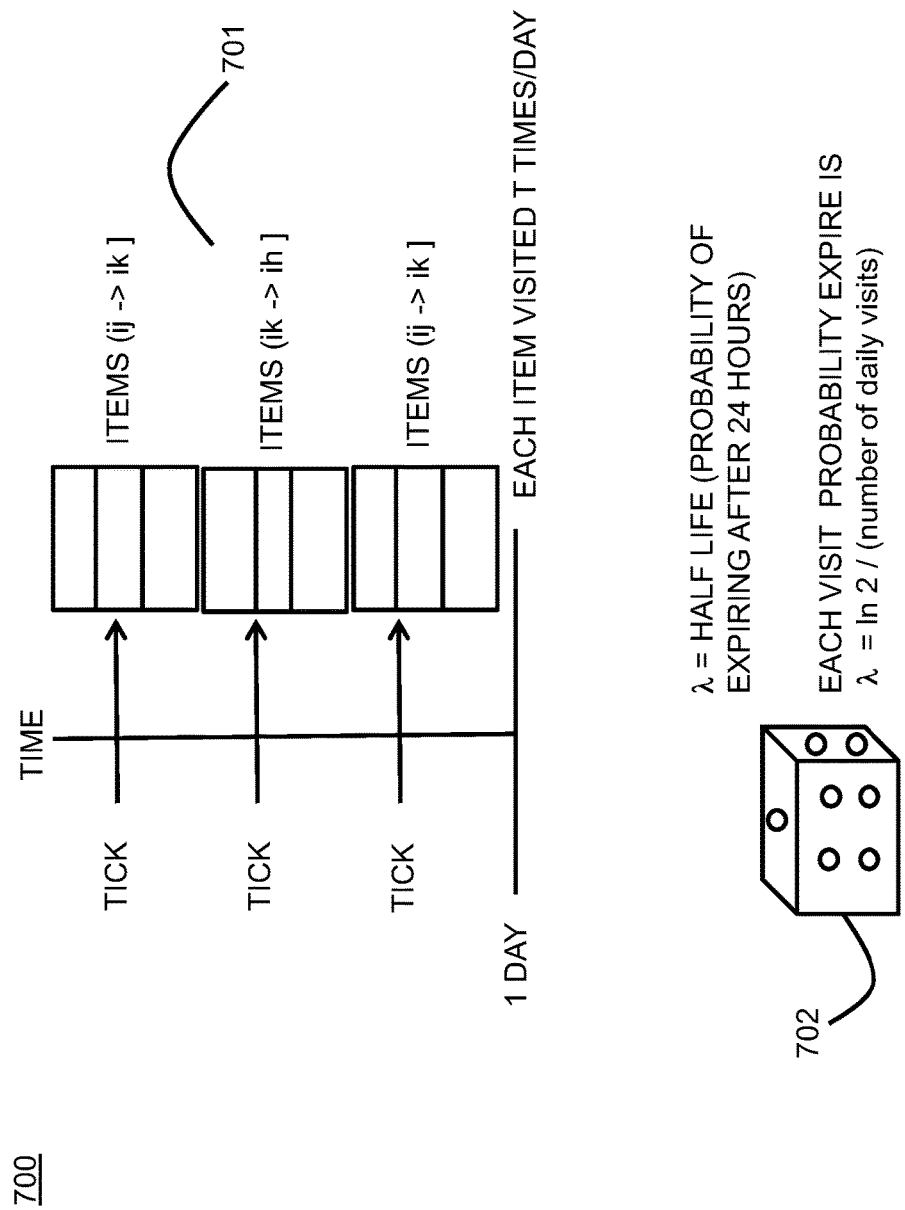
Figure 8:
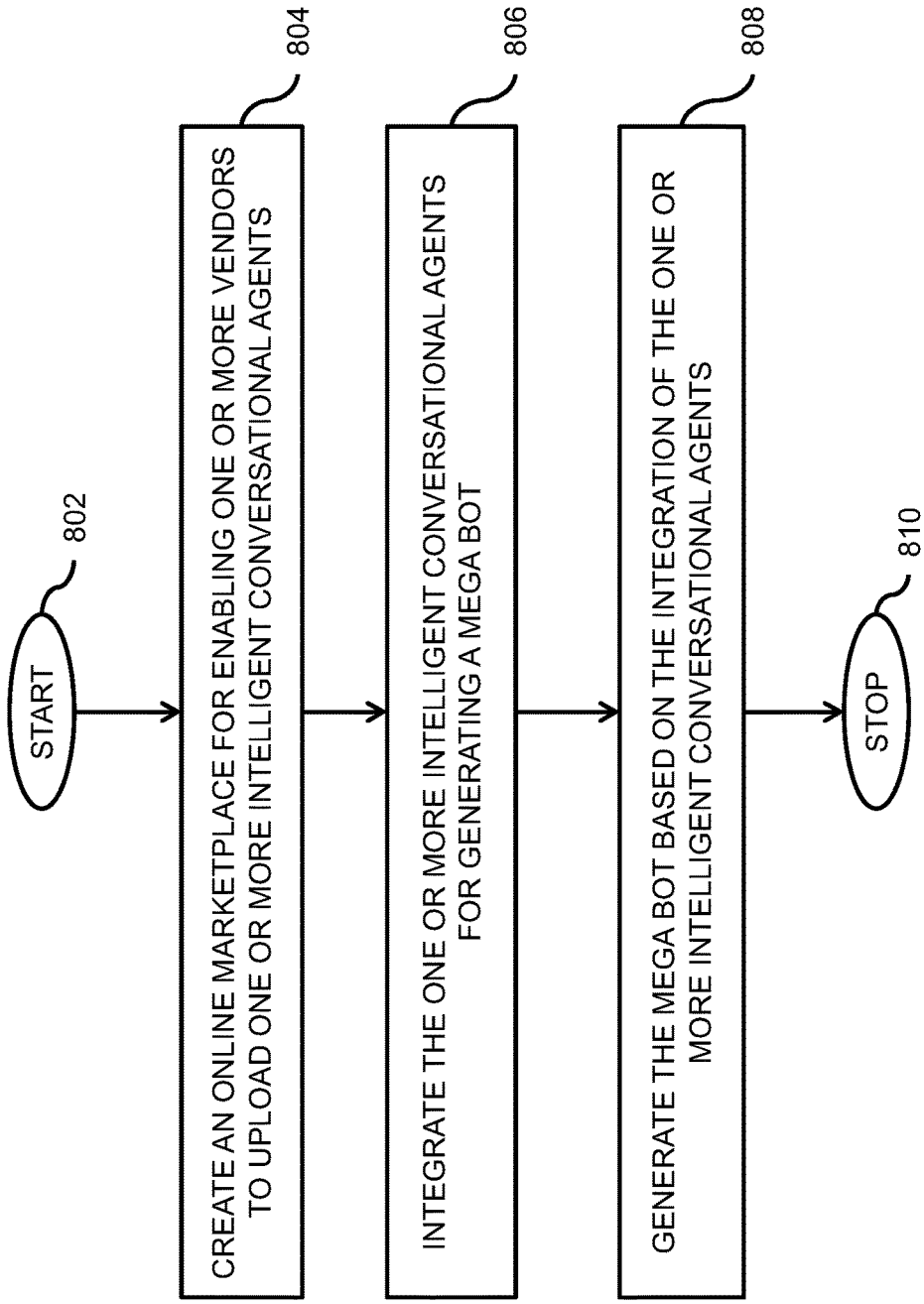

Having thus described the invention in general terms, reference will now be made to the accompanying drawings, which are not necessarily drawn to scale, and wherein:

FIG. 1 illustrates an interactive computing environment for performing a method for encoding user count with a low memory footprint for advertising, in accordance with various embodiments of the present disclosure;

FIG. 2 illustrates a block diagram of a computing device, in accordance with various embodiments of the present disclosure;

FIG. 3 illustrates a sequence of events of a use case, in accordance with various embodiments of the present disclosure;

FIG. 4 illustrates a memory representation for storing M*M counters in N buckets of M items, in accordance with an embodiment of the present disclosure;

FIG. 5 illustrates the algorithm representation for looking up an item in the bucket (a GET or SEARCH operation), in accordance with an embodiment of the present disclosure;

FIG. 6 illustrates a representation of the algorithm for increasing a counter in accordance with an embodiment of the present disclosure;

FIG. 7 illustrates a block diagram of a probabilistic approach to perform computation using repeated small non-blocking visits to a key subset, in accordance with an embodiment of the present disclosure; and FIG. 8 illustrates a flowchart of a method for encoding the one or more users count with a low memory footprint for advertising, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to and without imposing limitations upon, the present technology.

FIG. 1 illustrates an interactive computing environment 100 for encoding one or more user count with a low memory footprint for advertising, in accordance with various embodiments of the present disclosure. In an embodiment of the present disclosure, the encoding can be done for multiple applications such as Internet of Things, Virtual Reality, Augmented Reality and the like. The encoding of one or more user count can be applied where accurate user count needs to be determined for desired purposes such as for advertising and targeting users in a more efficient manner. The interactive computing environment 100 includes one or more user 104, a user device 106, a communication device 108 and a communication network 110. In addition, the interactive computing environment 100 includes a computer system 112, a server 114 and a database 116.

The interactive computer environment 100 includes a user environment 102. The user environment 102 is a working environment of one or more user 104. The user environment 102 includes one or more user 104 and the user device 106. One or more user 104 is any person associated with the user environment 102. In an embodiment of the present disclosure, one or more user 104 is any organization associated with the user environment 102. One or more user 104 accesses the user device 106 in the user environment 102. One or more user 104 accesses the user device 106 and generates user visibility notification.

The interactive computer environment 100 includes the user device 106. The user device 106 is and device associated with one or more user 104 in the user environment 102. In an embodiment of the present disclosure, the user device 106 is any smart device that mainly includes a display and network connectivity. In an embodiment of the present disclosure, the user device 106 is a portable communication device. In an embodiment of the present disclosure, the user device 106 is a smart television. In an example, the portable communication device includes television, laptop, smartphone, tablet, smartwatch, and the like. In another embodiment of the present disclosure, the user device 106 is a fixed communication device. In an example, the fixed communication device includes a desktop, a workstation PC, gaming console and the like.

The user device 106 performs computing operations based on a suitable operating system installed inside the user device 106. In general, operating system is system software that manages computer hardware and software resources and provides common services for computer programs. In addition, the operating system acts as an interface for software installed inside the com user device 106 to interact with hardware components of the user device 106.

In an embodiment of the present disclosure, the operating system installed inside the user device 106 is a mobile operating system. In an embodiment of the present disclosure, the user device 106 performs computing operations based on any suitable operating system designed for portable communication device. In an example, the mobile operating system includes but may not be limited to Windows operating system from Microsoft, Android operating system from Google, iOS operating system from Apple. In another example, the mobile operating system includes Symbian operating system from Nokia, Bada operating system from Samsung Electronics and BlackBerry operating system from BlackBerry. However, the operating system is not limited to above mentioned operating systems. In an embodiment of the present disclosure, the communication device 108 operates on any version of particular operating system of above-mentioned operating systems.

In another embodiment of the present disclosure, the user device 106 performs computing operations based on any suitable operating system designed for fixed communication device. In an example, the operating system installed inside the user device 106 is Windows from Microsoft. In another example, the operating system installed inside the user device 106 is macOS from Apple. In yet another example, the operating system installed inside the user device 106 is Linux based operating system. In yet another example, the operating system installed inside the user device 106 may be one of UNIX, GNU Linux, BSD and the like. However, the operating system is not limited to above mentioned operating systems. In an embodiment of the present disclosure, the user device 106 operates on any version of particular operating system of above-mentioned operating systems.

The interactive computing environment 100 includes the communication device 108. The communication device 108 is associated with one or more user 104. The computer system 112 utilizes the communication device 108 to connect to one or more user 104. In an embodiment of the present disclosure, the communication device 108 is any smart device that mainly includes a display, camera and network connectivity. In an embodiment of the present disclosure, the communication device 108 is a portable communication device. In an example, the portable communication device includes laptop, smart phone, tablet, smart watch, and the like. In another embodiment of the present disclosure, the communication device 108 is a fixed communication device. In an example, the fixed communication device includes a desktop, a workstation PC and the like.

The communication device 108 performs computing operations based on a suitable operating system installed inside the communication device 108. In general, operating system is system software that manages computer hardware and software resources and provides common services for computer programs. In addition, the operating system acts as an interface for software installed inside the communication device 108 to interact with hardware components of the communication device 108.

In an embodiment of the present disclosure, the operating system installed inside the communication device 108 is a mobile operating system. In an embodiment of the present disclosure, the communication device 108 performs computing operations based on any suitable operating system designed for portable communication device. In an example, the mobile operating system includes but may not be limited to Windows operating system from Microsoft, Android operating system from Google, iOS operating system from Apple. In another example, the mobile operating system includes Symbian operating system from Nokia, Bada operating system from Samsung Electronics and BlackBerry operating system from BlackBerry. However, the operating system is not limited to above mentioned operating systems. In an embodiment of the present disclosure, the communication device 108 operates on any version of particular operating system of above-mentioned operating systems.

In another embodiment of the present disclosure, the communication device 108 performs computing operations based on any suitable operating system designed for fixed communication device. In an example, the operating system installed inside the communication device 108 is Windows from Microsoft. In another example, the operating system installed inside the communication device 108 is macOS from Apple. In yet another example, the operating system installed inside the communication device 108 is Linux based operating system. In yet another example, the operating system installed inside the communication device 108 may be one of UNIX, GNU Linux, and the like. However, the operating system is not limited to above mentioned operating systems. In an embodiment of the present disclosure, the communication device 108 operates on any version of the particular operating system of above-mentioned operating systems.

In an embodiment of the present disclosure, the user device 106 and the communication device 108 are same. In another embodiment of the present disclosure, the user device 106 and the communication device 108 are different. In yet another embodiment of the present disclosure, the user device 106 and the communication device 108 are of the same type. In yet another embodiment of the present disclosure, the user device 106 and the communication device 108 are of different type.

The interactive computing environment includes the communication network 110. The communication device 108 of one or more user 104 connects to the computer system 112 through the communication network 110. In addition, the communication network 110 is a part of network layer responsible for connection of the communication device 108 to the computer system 112. Further, the communication network 110 may be any type of network. In an embodiment of the present disclosure, type of the communication network 110 is a wireless mobile network. In another embodiment of the present disclosure, type of the communication network 110 is a wired network with a finite bandwidth. In yet another embodiment of the present disclosure, type of the communication network 110 is a combination of the wireless and the wired network for the optimum throughput of data transmission. In yet another embodiment of the present disclosure, type of the communication network 110 is an optical fiber high bandwidth network that enables a high data rate with negligible connection drops.

Furthermore, the communication network 110 includes a set of channels. Moreover, each channel of the set of channels supports a finite bandwidth. The finite bandwidth of each channel of the set of channels is based on the capacity of the communication network 110. Also, the communication device 108 possesses a unique machine address (hereinafter "MAC"). MAC uniquely identifies each of the communication device 108 over the communication network 110.

The interactive computer environment 100 includes computer system 112. The computer system 112 performs a method to encode one or more user counts with a low memory footprint for advertising. The computer system 112 receives real-time and adaptive frequency of visibility of one or more user 104 in the user environment 102. The visibility of one or more user 104 is the number of times the computer system 112 receives a request from the user device 106. In an example, the request may be received for receiving an advertisement, real-time bidding OpenRTB Bid Request, or any other content. The frequency of visibility of one or more user 104 is received by the computer system 112 whenever one or more user 104 accesses the user device 106. The computer system receives the frequency of visibility of one or more users 104 along with the user device id associated with the user device 106.

In an embodiment of the present disclosure, the user device id includes at least one of IMEI number of the user device 106, TAC number of the user device 106, Mac addresses of the user device 106, advertising ID of the user device 106, IDFA number of the user device 106, AAID number of the user device 106, cookie ID of the user device 106 fingerprint identifier based at least on the internet IP address of the user device 106 or UDID number of the user device 106. In an embodiment of the present disclosure, the user device id may include additional data from the above-mentioned data.

The computer system 112 receives the user device id and associates the user device id with one or more user 104. The computer system 112 measures the frequency of visibility of one or more user 104 to calculate the attention level of one or more user 104. The computer system 112 calculates the attention level of one or more user 104 using one or more algorithms.

In an embodiment of the present disclosure, the method measures consumption of advertisements by one or more users 104 in real-time. The advertisements may be any of television advertising or connected television advertising. In general, the connected television advertisements are served over OTT platforms on mobile devices and smart TVs. In addition, the smart TVs may be OTT enabled or connected to an amazon fire stick to enable OTT.

In an embodiment of the present disclosure, the method includes creating several different zones. In general, the number of different zones is referred to as layers. In addition, the layers follow an exponential progression on the number of advertisements. In an example, the exponential progression starts with layer 1 with exactly one advertisement. The exponential progression grows with layer 2 with approximately 8 advertisements seen in the previous hour, layer 3 with 16 advertisements, layer 4 with 32 advertisements and layer 5 with 64 advertisements. Further, the exponential progression grows at layer 6 with 128 advertisements, layer 7 with 256 advertisements, layer 8 with 512 advertisements, layer 9 with 1024 advertisements, layer 10 with 2048 advertisements and so on.

The layers send several impressions to the computer system 112. The computer system increases the impression count using a probabilistic approach which might result or not in a change to a greater layer. The computer system 112 tags the impressions received from the layers. The tagging of impression allows the maintenance of a ledger of traffic received and auctions won. In an embodiment of the present disclosure, the layers may be mapped to awareness levels. In another embodiment of the present disclosure, the layers may not be mapped to awareness levels.

In addition, the layers may be used to target inventory with a high chance of interaction as a targeting option on the real-time bidding configuration interface. Further, the layers allow monitoring of computing cost, network traffic and revenue generated for each layer. In an example, an automated process analyzes the advertising campaigns comparing the layers the impressions have been tagged to with the number of impressions and the revenue generated. In addition, the automated process determines the relation between cost of processing and return of investment. Further, the computer system 112 automatically disconnects the layers with low return of investment to receive less traffic and save processing and operational cost. Furthermore, the method is monitored by A/B test analysis and shows efficiency in reducing the cost without harming the key business metric of revenue.

In an embodiment of the present disclosure, one or more user 104 is exposed to fewer advertisements and higher levels of engagement to the advertisements. An awareness model is encoded as a variable in anonymized traffic databases. The awareness directly maps to better performance of one or more user 104. In addition, a relation between the layers and a click probability for shows higher awareness for low-frequency layers on different device types, different creative types, campaign types or any other way.

The computer system 112 utilizes two different methods—a single-window method and a double window method to determine the longevity of data and perform the viewability counter reset. The single window method works on the combination of two numbers, the exact count and the exact time in the future when the data is no longer relevant. The non-relevant data is either deleted or forgotten. In addition, the counter disappears automatically if no future update occurs on the counter and end date is reached.

Further, the single window method is encoded with no less than 16 bytes in a 64-bit system. Furthermore, the overhead for accessing indexing or hashing is added in the single window method. Also, the overhead representing the user device 106 id of an UUID is added. The UUID maybe apple IDFA, Google IFA or any other UUID which is of at least 16 bytes. The double window method uses two probabilistic counters and cycles a full reset of one of the counters every hour. In addition, the double window method allows storing of both counters in one byte, representing an order of magnitude of memory savings.

In an embodiment of the present disclosure, the computer system 112 receives the frequency of visibility of one or more user 104 on identification of user device 106 in the advertising offer inventory. In another embodiment of the present disclosure, the computer system 112 receives the frequency of visibility of one or more user 104 in accordance with number of times an impression is served to one or more user 104 by the computer system 112. In yet another embodiment of the present disclosure, the computer system 112 receives the frequency of visibility of one or more user 104 when one or more user 104 accesses at least one of an application, a website, a domain and an application bundle.

In yet another embodiment of the present disclosure, the computer system 112 receives the frequency of visibility of one or more user 104 when one or more user 104 has visited at least one of an application, a website, a domain and an application bundle. In yet another embodiment of the present disclosure, the computer system 112 receives the frequency of visibility of one or more user 104 on tracking of one or more user 104 by the computer system 112 at a point of interest, delimited by a geospatial area. In yet another embodiment of the present disclosure, the computer system 112 receives the frequency of visibility of one or more user 104 by any other means.

The computer system 112 encodes the frequency of visibility of one or more user 104 (herein after "user visibility count") with a memory saving approach. The computer system 112 encodes the user visibility count to take one or more actions. The one or more actions includes at least one of serving ads to one or more user 104 when one or more user 104 reaches a particular threshold of visits on a particular website or application and serve ads to one or more user 104 when one or more user 104 reaches a particular threshold of visits to real-world locations.

The computer system 112 encodes the user visibility count using a probabilistic approach to reduce memory usage. The probabilistic approach performs a set of actions. The set on actions includes at least one of increasing in the user visibility count, decreasing the user visibility count and reset the user visibility count to zero. The computer system 112 encodes the user visibility count using the probabilistic approach by performing a pseudo aleatory computation. The computer system 112 performs the pseudo aleatory computation and generates a random number. The computer system 112 compares the random number with the user visibility count.

The computer system 112 compares the random number with the user visibility count and increases the user visibility count of positive comparison, decreases the user visibility count on negative comparison and resets the user visibility count to zero-on-zero frequency of the visibility of one or more user 104.

In an embodiment of the present disclosure, the layers definition remains within a user frequency service. The user frequency service uses a method of statistical simulation of a counter and uses only an octet to represent the state. In an example, the layers definition are—0000->0->means the user has not been seen. In another example, the layers definition is 0001->first->means that the user has been exactly one number of times. In yet another example, the layers definition is 0011->8->1 and 2 passes to one-eighth part of 8 and so on. In addition, the probabilistic approach experiences change using a combination of deterministic and stochastic changes where the rules change to a new state and service reports back the new state.

The transitions follow a set of rules. In an example, the rules include changing to first from 0, changing from first to one eighth of the times to 8, else change to 2, changing from 8 to one eighth of the times to 16, and otherwise stay at 8 and so on. In addition, the following set of rules does not change once it is reached the highest layer or count, which may be 32768 or a higher power of two for applications that need to track higher counts.

In an embodiment of the present disclosure, the probabilistic approach uses an octet of four bits to represent a state. In addition, the usage of four bits allows the possibility of two pieces of information on a byte. Further, one or more user 104 frequency agent mirrors an operation into two counters to make a byte. Furthermore, one of two octets is reset to 0000 after every hour. The most significant octet resets at the beginning of each odd hour and the least significant resets on even hours.

In an embodiment of the present disclosure, the computer system 112 uses a one-hour period concurrent timer. One period timer starts 60 minutes after the service setup and resets either all the significant counter octets or all the less significant counter octets alternatively. In addition, the service performs state change operation on both octets and reports the highest octet as the result. Further, the octet with the highest count is reported to the computer system 112 and the count is stored for a period greater than one hour but less than two hours.

In an embodiment of the present disclosure, the counters are represented in a byte buffer that controls all allocated memory. The memory needs to employ one byte to represent the user device id and one byte for two octets. This representation allows a theoretical capacity of 536870912 user counter per GB of RAM.

In an embodiment of the present disclosure, the counters may be stored on the same key in different ways. In another embodiment of the present disclosure, the embodiments may not be stored on the same key. In an example, the different ways of storing the counters include packing, map on the user space and counter metadata.

In an embodiment of the present disclosure, a RAW counter protocol sends 64 bits of information to represent one or more user 104. In addition, the bits are generated using a murmur hash or like make the bits statistically independent. In addition, the first 32 bits determine the active buffer allocation areas. The buffer allocation areas are determined by a modulo operation. Each buffer allocation is determined by 20 bytes. Further, the 20 bytes correspond to a byte representing the identity and a byte representing the counters.

The computer system 112 encodes the user visibility count by using one or more algorithms. One or more algorithms include one or more hashing functions. One or more hashing functions includes at least one of murmur hash, buzhash, CRC32, FNV hash, p hash, d hash and other cryptographic or non-cryptographic hash functions.

In an embodiment of the present disclosure, the system has a use case of storing two different counters for the user. In addition, the system allows for many counts per user identity as a derivative of the user and the use case. In an example, a hash function of the user identifier is employed with a fixed category code, i.e.: hash (UID, A)->UID', hash (UID, B)->UID".

In an embodiment of the present disclosure, the system follows a sequence of events to implement the use case (as shown in FIG. 3). In the first step, an action for an impression comes into the system. In the second step of the sequence, the system checks and updates the count of the user as related to the impression and determines a layer for awareness layer as a power of two. In the third step, the system optionally uses the information for a bid or no bid decision and save processing costs on low awareness levels. In the next step, the system allows the advertisers to target the awareness levels. In the following step, the system adds a variable of the awareness level on a report. In addition, the system dynamically adjusts powers of two, powers of three or changes the function of activation that decides layer ownership in real-time to any value.

The awareness layer is a first-class citizen of the data model. In addition, every activity of the system is tagged against the awareness model and the awareness model is encoded as a variable in an anonymized traffic database.

Further, the client performance is enriched with the awareness model as an additional column. Furthermore, the system shows a clear relationship between the awareness layer and the probability of click mathematical analysis as strongly correlated.

In another embodiment of the present disclosure, the system uses a twin set of counters for fixed window operation. Multiple contexts are resettled alternatively at regular intervals in order to have an expiration window with accurate time length. In addition, the multiple contexts allow the decay to be known and non-probabilistic.

The counter in the above method uses an octet to represent the state. In addition, two pieces of information are hosted on a single byte. The user frequency mirrors the operation in two counters that make the single byte but one of the octets is reset to 0000 every hour. Further, the most significant octet is reset once at the beginning of each hour and the least significant octet is reset on even hours.

Furthermore, a process runs after 60 minutes of the service setup and resets either the more significant counter octets or all the less significant counter octets alternatively. Also, the service performs the state change operation on both octets and the highest octet as result. The octet with the highest count is reported and the count is stored for a period longer than one hour but less than two hours.

In an embodiment of the present disclosure, an aggregate of the relation among layers and click probability for the aggregate of programmatic ad campaigns is done. In addition, the table is plotted in a line graph indicating a strong inverse correlation between the layers and the CTR probability. In an example, layer 1 is at a CTR of (1, 32), layer 2 is at CTR (1, 19), layer 3 is at CTR (1, 13) and so on.

In an embodiment of the present disclosure, the data structure mimics a hash table. The value in the hash table is a fixed-length array called a bucket. Each bucket stores a fixed amount of identity counters pairs. In addition, the data structure holds pairs of user identifiers and counter data. The user identifier is subjected to a hash function to transform it into a 64-bit numeric identifier.

Further, the 64-bit user identifier is split into two 32-bit parts taking the most and least significant bits. The first 32-bit part is used to determine which bucket is looked up to locate the counter data. Furthermore, identity proof is represented from the remaining 32 bits taking as little bits as possible to obtain desired false positive behavior. In an example, 8 bits are enough for a bucket size of 10 and 16 bits are enough for a bucket size of 100 elements.

The probability of false positives is greatly reduced when the 32 bits selecting the bucket among all the possible memory buckets are used in combination. In addition, a Monte Carlo simulation is applied to measure the error rates for different configurations. In an example of source code when two bytes are used, the first 8 bits represent the user identity, and the remaining 8 bits are employed for handling two probabilistic counters counting up to 32768.

In an embodiment of the present disclosure, all the above-mentioned mechanisms are devices to perform probabilistic computation. In an example, the probabilistic computation includes the exponential computation of decay.

The interactive computing environment 100 includes the server 114. The computer system 112 is associated with the server 114. In general, server is a computer program that provides service to another computer programs. In addition, server may provide various functionalities or services, such as sharing data or resources among multiple administrators, performing computation for an administrator and the like. In an embodiment of the present disclosure, the server 114 is at least one of a dedicated server, cloud server, network server, virtual private server and the like. However, the server 114 is not limited to the above-mentioned servers.

In addition, the server 114 includes the database 116. In general, database is a collection of information that is organized so that it can be easily accessed, managed and updated. In an embodiment of the present disclosure, the database 116 is at least one of at least hierarchical database, network database, relational database, object-oriented database and the like. The database can be a file system database, an in-memory database, or a direct memory area reserved by a program. The database 116 provides storage location to store the user visibility count and data associated with the computer system 112. In an embodiment of the present disclosure, the database 116 provides storage location to all the data and information required by the computer system 112. In an example, the database 116 is connected to the server 114. The server 114 stores data in the database 116. The server 114 interacts with the database 116 to retrieve the stored data.

FIG. 2 illustrates a block diagram of a computing device 200, in accordance with various embodiments of the present disclosure. The computing device 200 represents internal hardware components of the communication device 108. The computing device 200 includes a bus 202 that directly or indirectly couples the following devices: memory 204, one or more processors 206, one or more presentation components 208, one or more input/output (I/O) ports 210, one or more input/output components 212, and an illustrative power supply 214. The bus 202 represents what may be one or more busses (such as an address bus, data bus, or combination thereof). Although the various blocks of FIG. 2 are shown with lines for the sake of clarity delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 2 is merely illustrative of an exemplary computing device 200. The computing device 200 can be used in connection with one or more embodiments of the present invention. The distinction is not made between such categories as "workstation," "server," "laptop," "hand-held device," etc., as all are contemplated within the scope of FIG. 2 and reference to "communication device."

The computing device 200 typically includes a variety of computer-readable media. The computer-readable media can be any available media that can be accessed by the computing device 200 and includes both volatile and non-volatile media, removable and non-removable media. By way of example, and not limited, the computer-readable media may comprise computer-readable storage media and communication media. The computer-readable storage media includes volatile and nonvolatile, removable, and non-removable media implemented in any method or technology for storage of information such as computer-readable instructions, data structures, program modules or other data.

The computer-readable storage media with memory 204 includes, but is not limited to, non-transitory computer-readable media that stores program code and/or data for longer periods of time such as secondary or persistent long-term storage, like RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 200. The computer-readable storage media associated with the memory 204 and/or other computer-readable media described herein can be considered computer-readable storage media for example, or a tangible storage device. The communication media typically embodies computer-readable instructions, data structures, program modules or other data in a modulated data signal such as a carrier wave or other transport mechanism and in such a includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The computing device 200 includes one or more processors that read data from various entities such as the memory 204 or I/O components 212. One or more presentation components 208 present data indications to a user or other device. Exemplary presentation components include a display device, speaker, printing component, vibrating component, etc. One or more I/O ports 210 allow the computing device 200 to be logically coupled to other devices, including one or more I/O components 212, some of which may be built in. Illustrative components include a microphone, joystick, game pad, satellite dish, scanner, printer, wireless device, etc.

FIG. 4 illustrates a block diagram 400 for memory representation for storing M*N counters in N buckets of M counters, in accordance with an embodiment of the present disclosure. The interactive computing environment includes three elements—401, 402 and 403. 401 illustrates a continuous buffer of M*N items. In addition, the items can be represented as a sequence of N elements called buckets. Each bucket includes up to M items. The above representation results in the storage of all the counters or variations of the same key or UUID in the same bucket.

Further, 402 illustrates an interval representation of an item. The item is a pair of data, the first named identity and the second named payload. Furthermore, the identity is a bit sequence generated form of the UUID and takes a few bits of the output of the hashing window. Moreover, the number of bits taken depends upon the number of items per bucket (M). If M is very large, it includes enough bits to avoid identity clashing among different input keys. The above process includes the process where two different keys generate the same identity.

In an embodiment of the present disclosure, 403 illustrates that a payload can be a variety of things with a plurality of options. The plurality of option includes a counter, a counter followed by expiration, indicating after which moment of time the data is invalid. In addition, the plurality of options includes a counter followed by a property of metadata. In an example of possible metadata, a counterName or counterCode stores multiple counters per key. Further, the plurality of options includes several counters packed together.

FIG. 5 illustrates a block diagram 500 of algorithm representation for looking up an item in the bucket, in accordance with an embodiment of the present disclosure. 501 shows that the key or UUID is concatenated with metadata such as the counter name, type or code and hashed together. The hash action after 501 shows that the algorithm hashes the input key, adds the counterName in the process, and generates a hash output: a numeric representation of the key.

In an embodiment of the present disclosure, 502 illustrates the process of taking a hash for referencing the bucket in the memory structure and part of the hash is used to lookup the identity data stored in the data structure. There are other ways of doing this, such as applying two different hashes functions or even applying the same hashing function, adding to the key a prefix or suffix that is commonly known as "salt", and the process of salting the key. Whatever means are applied, the output is two numbers, one used to reference the bucket and the other to compare to the identity data.

In an embodiment of the present disclosure, 502 shows the process of selection of a bucket among the N buckets in the memory structure. The selection includes computing bucket modulo N, which will convert the number "bucket" into a number between 0 and N−1. In addition, 503 shows that the key, if exists, must be stored inside the selected bucket and not any other. Further, the M items stored in the bucket are visited and compared with the identity data stored on each one to the identity generated in step 502. This process of sequential repetition is usually called looping, and is restricted to exactly M iterations, and not M*N.

In an embodiment of the present disclosure, 504 shows a positive lookup of the identity data. The positive lookup is the identity value IDb contained in an item is equal to the identity value IDa generated in step 502. The positive lookup appends to a list of results in 505 and the 503 loops continues. The algorithm exits returning the accumulated list of payloads on identity matching buckets after comparing the identity of the M items in the selected bucket.

FIG. 6 illustrates a block diagram 600 for the representation of the algorithm for increasing a counter, in accordance with an embodiment of the present disclosure. In an embodiment of the present disclosure, 601 and 602 have the same description as 501 and 502 in FIG. 5. In addition, 603 includes looping to search if the value is already present in the data structure. Further, 604 if it is not present, the value is initialized to its default counter value (usually 1) and stored in the first found free empty position, a position is free when the identity value corresponds to the value 0.

Further, 605 follows the approach described in this document to perform a probabilistic increase of the counter value taken when the counter is found in the bucket. The result of the increase may change the counter to the next value or not if the generated random value does not qualify for a state change. Furthermore, at 606, the algorithm returns the new value resulting after maybe increasing the value without needing to continue with the search loop of 603.

FIG. 7 illustrates a block diagram 700 of probabilistic approach to perform computation using repeated small non-blocking visits to a key subset, in accordance with an embodiment of the present disclosure. In an embodiment of the present disclosure, 700 provides a method to automatically expire delete counters after a period. The method is based on a simulation of a physical process like radioactive decay and is described by a parameter called "half-life" or λ (Greek letter lambda). This parameter controls the time after which 50% of the data will be removed. In an example, if the half-life is 1 day, after one day approximately 50% of the data will remain, after 2 days, only 25% of the data will remain, after 3 days only 12%, and so on.

In addition, the method avoids visiting the M*N items in the data structure to perform the half-life expiration. The method splits M*N into smaller sets instead of doing M*N checks for expiration in one go, with the property of each time visited T times at time. Further, 701 illustrates a repetition of period visit of some items on events called "ticks". The tick is where the system controls how many times each item is visited a day (T) and the number of items to be checked for each tick (k-j). Furthermore, the system trades one big blocking M*N checks for several small ones by selecting the appropriate values for T and items per check. Moreover, 702 shows that the expiration check does a probabilistic computation to learn if by chance the item is deleted in the checks, where the deletion can happen with probability A where A is In 2 divided by the number of probability checks.

FIG. 8 illustrates a flowchart 800 of a method for encoding the one or more users count with a low memory footprint for advertising, in accordance with various embodiments of the present disclosure. It may be noted that in order to explain the method of the flowchart 800, references will be made to the elements explained in FIG. 1. The flow chart 800 starts at step 802. At step 804, the computer system 112 receives the real-time and adaptive frequency of the user visibility. The frequency of the user visibility is the number of times the computer system 112 receives the request from the user device. At step 806, the computer system 112 receives the user device 106 ID associated with the user. The user device 106 ID is a unique string of numbers and letters. The unique string of numbers and letters identifies the user device 106 associated with the one or more user. At step 808, the computer system 112 encodes the user visibility count. The user visibility count is encoded by using the one or more data structures and the one or more hardware run algorithms.

The flow chart 800 terminates at step 810. It may be noted that the flowchart 800 is explained to have above stated process steps; however, those skilled in the art would appreciate that the flowchart 800 may have more/less number of process steps which may enable all the above stated embodiments of the present disclosure.

The foregoing descriptions of specific embodiments of the present technology have been presented for purposes of illustration and description. They are not intended to be exhaustive or to limit the present technology to the precise forms disclosed, and obviously, many modifications and variations are possible considering the above teaching. The embodiments were chosen and described in order to best explain the principles of the present technology and its practical application, to thereby enabling others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer implemented method for encoding one or more user visibility counts with a low memory footprint for advertising, the computer implemented method comprising:

receiving, at a computer system with a processor, real-time and adaptive frequency of a user visibility count, wherein the frequency of the user visibility count represents number of times the computer system receives a request from a user device;

receiving, at the computer system with the processor, a user device ID associated with a user, wherein the user device ID is a unique string of numbers and letters, wherein the unique string of numbers and letters identifies the user device associated with one or more users, wherein the user device ID comprises at least one of IMEI number, TAC number, Mac addresses, advertising ID, IDFA number, AAID number, cookie ID and UDID number;

encoding, at the computer system with the processor, the user visibility count, wherein the user visibility count is encoded by using one or more data structures and one or more hardware run algorithms, wherein the user visibility count is encoded using a probabilistic approach, wherein the probabilistic approach comprises probabilistically increasing the user visibility count, decreasing the user visibility count, and resetting the user visibility count to zero, wherein the one or more hardware run algorithms comprises a hashing function, and wherein the hashing function comprises at least one of murmur hash, buzhash, FNV hash, p hash, d hash and other cryptographic or noncryptographic hash functions; and resetting of the user visibility count to zero when the frequency of the user visibility count is zero for a fixed period of time.

2. The computer-implemented method as recited in claim 1, wherein the computer implemented method uses a probabilistic approach to encode the user visibility count to reduce the storage required to encode the user visibility count.

3. The computer-implemented method as recited in claim 1, wherein the computer-implemented method performs a pseudo aleatory computation, and wherein the computer-implemented computation generates a random number by performing the pseudo aleatory computation.

4. The computer-implemented method as recited in claim 3, wherein the computer-implemented method performs comparison of the generated random number with a probability relation of a current user visibility count for increasing the user visibility count, and wherein a positive comparison increases the user visibility count.

5. The computer-implemented method as recited in claim 3, wherein the computer-implemented method performs comparison of the generated random number with a probability relation of a current user visibility count for decreasing the user visibility count, and wherein a negative comparison decreases the user visibility count.

6. The computer-implemented method as recited in claim 4, wherein the probability relation is a relation between the current user visibility count, wherein the probability relation changes with change in state of the user visibility count.

7. A computer system comprising:

one or more processors; and a memory coupled to one or more processors, the memory for storing instructions which, when executed by one or more processors, cause the one or more processors to perform a method for encoding one or more user visibility counts with a low memory footprint for advertising, the method comprising:

receiving, at a computer system, real-time and adaptive frequency of a user visibility count, wherein the frequency of the user visibility count represents number of times the computer system receives a request from a user device;

receiving, at the computer system, a user device ID associated with a user, wherein the user device ID is a unique string of numbers and letters, wherein the unique string of numbers and letters identifies the user device associated with one or more users, wherein the user device ID comprises at least one of IMEI number, TAC number, Mac addresses, advertising ID, IDFA number, AAID number, cookie ID and UDID number;

encoding, at the computer system, the user visibility count, wherein the user visibility count is encoded by using one or more data structures and one or more hardware run algorithms, wherein the user visibility count is encoded using a probabilistic approach, wherein the probabilistic approach comprises probabilistically increasing the user visibility count, decreasing the user visibility count, and resetting the user visibility count to zero, wherein the one or more hardware run algorithms comprises a hashing function, and wherein the hashing function comprises at least one of murmur hash, buzhash, FNV hash, p hash, d hash and other cryptographic or noncryptographic hash functions; and resetting of the user visibility count to zero when the frequency of the user visibility count is zero for a fixed period of time.

8. The computer system as recited in claim 7, wherein the computer system uses a probabilistic approach to encode the user visibility count to reduce the storage required to encode the user visibility count.

9. The computer system as recited in claim 7, wherein the computer system performs a pseudo aleatory computation, and wherein the computer system generates a random number by performing the pseudo aleatory computation.

10. The computer system as recited in claim 9, wherein the computer system performs comparison of the generated random number with a probability relation of a current user visibility count for increasing the user visibility count, and wherein a positive comparison increases the user visibility count.

11. The computer system as recited in claim 9, wherein the computer system performs comparison of the generated random number with a probability relation of a current user visibility count for decreasing the user visibility count, and wherein a negative comparison decreases the user visibility count.

12. A non-transitory computer-readable storage medium encoding computer executable instructions that, when executed by at least one processor, performs a method for encoding one or more user visibility counts with a low memory footprint for advertising, the method comprising:

receiving, at a computing device, real-time and adaptive frequency of a user visibility count, wherein the frequency of the user visibility count represents number of times the computer system receives a request from a user device;

receiving, at the computing device, a user device ID associated with a user, wherein the user device ID is a unique string of numbers and letters, wherein the unique string of numbers and letters identifies the user device associated with one or more users, wherein the user device ID comprises at least one of IMEI number, TAC number, Mac addresses, advertising ID, IDFA number, AAID number, cookie ID and UDID number;

encoding, at the computing device, the user visibility count, wherein the user visibility count is encoded by using one or more data structures and one or more hardware run algorithms, wherein the user visibility count is encoded using a probabilistic approach, wherein the probabilistic approach comprises probabilistically increasing the user visibility count, decreasing the user visibility count, and resetting the user visibility count to zero, wherein the one or more hardware run algorithms comprises a hashing function, and wherein the hashing function comprises at least one of murmur hash, buzhash, FNV hash, p hash, d hash and other cryptographic or noncryptographic hash functions; and resetting of the user visibility count to zero when the frequency of the user visibility count is zero for a fixed period of time.

\* \* \* \* \*